Reissued May 30, 1944

Re. 22,489

UNITED STATES PATENT OFFICE 22,489

METHOD OF IMPROVING THE PROCESSING OF REFINED CHEMICAL PULPS INTO VISCOSE BY ADDING ANION ACTIVE AGENTS

Paul Henry Schlosser, Kenneth Russell Gray, and Earl Grand Hallonquist, Shelton, Wash., assignors to Rayonier Incorporated, San Francisco, Calif., a corporation of Delaware No Drawing. Original No. 2,331,935, dated October 19, 1943, Serial No. 321,694, March 1, 1940. Application for reissue April 6, 1944, Serial No. 529,784

14 Claims. (Cl. 260—217)

Our invention relates to improving the processing of refined chemical pulp into viscose by adding anion active agents.

More particularly, our invention relates to the adding of anion active agents to refined chemical pulp or to one of the viscose forming materials at a stage prior to completion of xanthation to provide an improved viscose solution. These solutions in turn are designed to be used in further manufacturing processes. The viscose solutions resulting from our invention or discovery may be employed in the manufacture of cellulose products, as artificial yarn or rayon, staple fiber, transparent films, or sausage casings.

While our invention relates primarily to improvements in the preparation of cellulose solutions by the viscose process, it should be understood that the principles involved are of a broad nature and may be applied also to the preparation of cellulosic solutions of other types, such as cuprammonium solutions of cellulose and solutions of cellulose derivatives, such as cellulose acetates, nitrates or ethers.

In all these instances the objective is to bring the cellulose into proper solution and the providing for this constitutes the primary object of our invention.

Specifically our invention provides a great improvement in most of the steps, such as shredding, xanthating, dissolving, filtering, and emulsifying or dispersing, which steps are involved in forming viscose solutions and preparing the same for use for further manufacturing processes.

Accordingly, for purposes of definiteness and clearness of description and illustration, our invention will be set forth as respects the steps involved in forming viscose solutions and preparing the same for use in further manufacturing processes, but it is to be understood that the invention is not to be limited to any such specific application.

In general, our invention, for a summary statement may be said to relate to treating, with certain anion active agents, the pulp or one or more of the viscose forming materials at any stage prior to the completion of xanthation while such pulp is being formed into a solution by the viscose process.

The procedure in preparing viscose solutions ordinarily involves the treatment of cellulose with caustic soda of about 18% concentration, then with carbon bisulphide and finally dissolving the xanthated fibers, resulting in a cellulosic solution with a caustic soda content of 5–8%. Since the viscose solution is essentially a cellulose solution, therefore it is desirable to keep all additions of foreign agents to an absolute minimum. Obviously, if any agent is to be added it should be present in very minute quantities and the question then arises as to whether it would be effective. Our invention comprises the discovery of agents which are very effective in greatly improving the preparation of the viscose, even when employed in very minute quantities and which at the same time are not otherwise objectionable.

In the customary manufacture of viscose solutions from refined chemical pulp for the spinning of artificial yarn or rayon, the pulp is subjected, in general, to the following steps, and the purpose of these steps is mainly as indicated:

*Steeping.*—The first step in the viscose process is known as steeping. Its purpose is mainly twofold, (1) to provide the pulp fibers with a certain amount of caustic soda necessary in the xanthating step and (2) to dissolve out certain impurities such as hemicelluloses. In steeping, the pulp, commonly employed in sheet form, is immersed in caustic soda solutions of mercerizing strength, as commonly used about 18%, and thereafter removed and subjected to pressing to eliminate part of the adhering caustic soda, together with the greater part of the dissolved impurities. The product after steeping is known as alkali cellulose. The action of the caustic soda in this steeping process should be uniform and complete, otherwise there would be parts of the fibers improperly prepared for xanthating.

*Shredding.*—The second step in the viscose process is that of shredding the alkali cellulose. Its purpose is the comminution of the sheet structure which still remains on completion of the steeping process. One object of this comminution is to properly expose the individual fibers to the action of oxygen for proper alkali cellulose ageing, i. e., to permit the lowering of viscosity. A second purpose of this comminution is to expose all portions of the fiber so that in the xanthating step where carbon bisulphide is added, all of the individual fibers will be completely treated.

*Ageing.*—The alkali cellulose after being shredded is kept for a certain time at a definite temperature depending on the viscosity and properties desired in the viscose at later periods of the process. This step is known as ageing of the alkali cellulose and involves essentially changes in the cellulose molecules or aggregates so that lower viscosities result.

*Xanthating and dissolving.*—On completion of the ageing period, the alkali cellulose is treated with carbon bisulphide to form sodium cellulose xanthate, a process called xanthation. The xanthated cellulose if properly formed, dissolves readily in dilute caustic soda to form the solution commonly known as viscose.

*Ripening.*—Immediately on solution of the xanthated cellulose in dilute caustic soda, certain chemical reactions take place, which gradually alter the chemical and physical properties of the viscose. These reactions are allowed to proceed to a definite extent under controlled conditions in order to impart the desired properties to the viscose necessary for satisfactory spinning. This operation is known as viscose ripening.

*Filtering.*—In the viscose solution there is usually a certain amount of undissolved fibers and gel-like material due to incomplete reaction of the cellulose fibers with the carbon bisulphide during xanthation. In the course of the ripening period the viscose solution is filtered several times to remove these gels and undissolved fibers. This is of importance as otherwise the fine openings in the spinnerets through which the viscose is extruded during the subsequent spinning process would soon become clogged.

*Emulsifying or dispersing.*—If the viscose solution is spun without further treatment, a high lustre yarn results. In many cases it is desirable to manufacture a yarn with subdued lustre, and this result may be obtained by emulsifying or dispersing small amounts of mineral oil or other immiscible materials in the viscose. Naturally it is of importance that these emulsions or dispersions be characterized by uniform minuteness of particle size in order to avoid breaking or weakening of the filaments by the interruption of the constant flow of viscose through the minute orifices of the spinneret. Further the emulsions or dispersions must be characterized by extreme stability, in that they must not deteriorate during the period required for viscose ripening.

Normal dissolving pulps in present use consist mainly of cellulose but contain appreciable amounts of non-cellulosic impurities such as hemicelluloses, fats, resins, waxes, etc. One of the main objects in the manufacture of a satisfactory dissolving pulp is to remove as much as possible of the non-cellulosic impurities, so that a whiter, purer pulp results which is capable in general of producing a higher grade yarn.

We find, however, that not all the non-cellulosic materials which can be removed are undesirable and in fact that certain of such impurities normally present in small amounts are highly beneficial in the steps involved in the preparing of the viscose solution. These beneficial impurities for the most part are surface active materials or materials which can give rise to the production of surface active materials during the steps of steeping or the other steps prior to completion of xanthation in the manufacture of rayon. In a pulp which has not been highly refined, these beneficial substances which are of the nature of fats, resins and waxes constitute a portion of the materials which are removable by organic solvents, for example ether, benzene, alcohol, etc. In general we find there is a direct relationship between filtration of the viscose and the ether extract of the pulp.

In theory, the problem of making a good pulp would be solved by removing all the undesirable, and retaining all the desirable substances. In practice, such a clean-cut separation is difficult to accomplish directly. We have discovered that better results are obtained by removing most of or all the undesirable materials without regard to the beneficial portion thereof and then to add to the pulp a sufficient amount of materials or agents having a similar action to the natural beneficial portion. Let it be noted that our invention lays no claim in connection with the purification of pulp to a certain degree of purity. White, highly purified pulps are very advantageous in the production of high grade yarns and for this reason are highly desired by the trade. Such high grade pulps are in general characterized by having ether extractable matter lower than .15%. (The expression "ether extractable matter" is often abbreviated herein to the commonly used expression "ether extract.") Such values refer to the amount of natural ether extractable material left in the pulp after the purification processes. In general, our invention is particularly concerned with those pulps which do not have remaining more than .15% of natural ether extractable material because pulps having ether extracts above this value represent in general pulps which have not been highly purified and although such pulps do not yield the highest grade yarns, nevertheless their processing into viscose is relatively simple and thus in such pulps there is usually little need for our invention.

We have discovered that there are agents, some chemically similar to, and some chemically different from, that portion of the impurities naturally present providing beneficial action. In general the agents which we have discovered are much more effective than the beneficial portion of the impurities naturally present. Accordingly, the compounds or agents of our discovery can be used in very minute quantities. This is doubly advantageous, because such additions of materials are inexpensive and also because the very pure pulp treated with our agents is substantially free from non-cellulosic materials due to the minuteness of the quantity of the agents required.

The surface active portion of the beneficial impurities, naturally present as such in the refined pulps or formed during the processing, are predominately of the general class known as anion active materials. By "surface active agent" we mean, for purposes herein set forth, such "surface active agents" which are at least dispersible in viscose solutions.

If agents of the anion active class are to be added directly to the pulp as such, i. e., while in the sheet or prior to its formation, they should be of the class which is substantially insoluble in caustic soda of the usual steeping concentration. The reason for this is that otherwise the agent or agents will be largely extracted from the pulp by the mercerizing caustic soda used in the steeping step. The final caustic soda concentration of the viscose solution will be from 5–8% and, heretofore it was thought necessary that only those anion active agents should be employed which are substantially soluble in such dilute caustic soda. To adopt both the above solubility requirements would limit the agents to be used for treating the pulp to that group which are insoluble in 18% caustic soda but soluble in 5–8% caustic soda solutions and the surface active agents of this group are very limited in number. Our experiments establish that of these few agents those that are available are not satisfactory or are undesirable in achieving the improvements herein set forth. We have found, however, that it is not necessary to limit ourselves to the use of materials which are soluble in 5–8% caustic soda. Our experiments show that there are a great many anion active compounds which are substantially insoluble in 18% and also substantially insoluble in 5–8% caustic soda concentrations and that they can be added to the pulp with the beneficial results in the various subsequent steps as will be herein set forth. The agents of this class of our discovery become dispersed in the viscose in a very fine state and hence tend to make the viscose slightly turbid, but such viscose solutions, nevertheless, are entirely satisfactory for most purposes and are improved in their properties as will be herein set forth.

Our experiments show that our agents neither beneficially contribute to or interfere with the penetration or wetting of the pulp in the steeping step. In short, the improvement brought about by our agents does not relate primarily to the penetration or wetting of the pulp. For instance, if only portions of the pulp employed in the manufacture of the viscose solution are treated with our agents, nevertheless there is no appreciable lessening of the improvements resulting from the use of our agents as respects the subsequent steps. The agents of our invention or discovery need not be applied to each or every sheet of the pulp, but such agents may be applied to alternate sheets of said pulp or to only a portion of the pulp material being processed into viscose. Moreover, our agent or agents can be added after steeping, for example during the shredding operation and yet nearly the full benefits of our invention accrue as if our agents were added to the original pulp itself. However, there are advantages in adding our agents to the pulp, firstly as a matter of convenience and secondly, in that a very uniform distribution is assured.

Our experiments also have shown that there are many anion active compounds which are soluble in 18% and soluble in 5–8% caustic soda concentrations, and that these can be added to the material being processed into viscose prior to the completion of xanthation with beneficial results. These anion active agents which are soluble in both concentrations of caustic soda may be added to the steeping solutions or they may be applied to the shredded pulp during the shredding step or at any stage prior to the completion of xanthation.

Accordingly, we have discovered that as respects anion active materials, that those anion active materials are applicable which have a solubility characteristic which is the same both in 18% caustic soda solutions and in the 5 to 8% caustic soda solutions. In other words, the compounds may be either insoluble in both concentrations of the caustic soda or may be soluble in both concentrations.

In connection with using anion active agents to treat the pulp it should be noted that it is possible to demonstrate experimentally, beneficial improvements through use of the class of materials soluble in mercerizing (18%) caustic soda. In the initial use of such a treated pulp commercially the added agents would be in part, though not completely, extracted by the caustic soda in the steeping operation. The steeping caustic soda however, is largely re-used and after a number of steeping operations an equilibrium would eventually be reached where the added agent would be largely retained by the pulp. In the rayon industry, however, the maintenance of the utmost uniformity is considered an extremely important requisite and for this reason it is much more practical to restrict treatment of the pulp by anion active agents to those agents which are insoluble in mercerizing caustic. As regards use of anion active agents subsequent to steeping it is of course practical to use either the class insoluble in 18% caustic soda or the soluble class.

If addition of anion active materials is made to the viscose solution, such additions merely lower the surface tension of the spinning solution or influence the coagulating conditions during spinning. We have discovered, however, that the great advantages and improvements in the various steps of viscose manufacture as will be herein set forth accrue only provided such materials or agents are added to the pulp or to the materials being processed prior to the completion of xanthation.

If these materials are added after xanthation, a viscose product of improved characteristics, such as is obtained when the said reagents are added prior to the xanthation step is not obtained. It is noteworthy that the viscose of our invention is characterized by being particularly free from undissolved or partly dissolved fibers which greatly facilitates subsequent filtrations. We have found that any filtration improvements which may be obtained by subsequently adding surface active materials to the viscose itself rather than prior to xanthation are of a very low order as compared to results obtained by employing our agents prior to the completion of xanthation and that such improvements as may be obtained are only brought about by the use of very high concentrations of surface active materials.

The advantages and improvements which our invention produces in the various steps of the viscose process are as follows and it is to be understood that all conditions and temperatures normally employed in the preparation of viscose may be employed with the use of our agents.

1. *Steeping.*—In the steeping process the action of the caustic soda should be uniform and complete; otherwise there would be parts of the fibers improperly prepared for xanthation. This uniformity of penetration can be properly insured by mechanical means, i. e., by correct sheet structure, and proper manipulation in the steeping operation. Our invention does not in any way relate to improved steeping properties of the sheet. The presence of our agents in the pulp in the concentrations employed by us during this steeping process does not to our knowledge affect the normal wetting and penetrating action of the caustic.

2. *Shredding.*—A principal object of shredding is comminution of the sheet structure in order to expose all portions of the fibers to the action of carbon bisulphide in the subsequent xanthating step. It is also important that this comminution can be brought about without excessive mechanical action on individual fibers and it is thus an advantage to have an alkali cellulose which will shred up readily. The pulps treated with our agents disintegrate much more easily and completely in the shredding operation. In other words, our agents, we have discovered, bring about a very positive opening up of the fibers over and above that which occurs when the pulp or alkali cellulose is not treated with our agents. This increased degree of comminution is evidenced by an increase in the volume of the shredded crumb. With unchanged time, this increase may amount to 25 percent. On the other hand shorter shredding times are possible, resulting in considerable saving in power as well as time. Examples of the decrease in apparent density of the shredded alkali cellulose produced by the addition of surface active agents when using refined chemical pulp are shown in Table I. It is to be noted that no such decrease in apparent density took place when using rayon-grade cotton linters.

TABLE I

*Effect of treatment with anion active materials prior to completion of shredding on the apparent density of the shredded alkali cellulose*

| Type of material | Amount based on pulp and specific material | Where added | Apparent density of shredded alkali cellulose | |
|---|---|---|---|---|
| | | | Untreated | Treated |
| (a) USING REFINED CHEMICAL PULPS CONTAINING APPROXIMATELY 0.065% ETHER EXTRACT | | | | |
| Fatty acid soaps | .02% sodium oleate | To pulp | .195 | .190 |
| | .06% sodium oleate | do | .195 | .180 |
| Soap forming materials | .05% coconut oil | do | .195 | .175 |
| | .05% diglycol oleate | do | .195 | .150 |
| | .08% hemlock resin | do | .195 | .180 |
| Alkyl aryl sulphonates | .02% "Santomerse No. 3" | do | .195 | .180 |
| Sulphated fatty alcohols | .05% sodium lauryl sulphate | do | .195 | .175 |
| Sulphonated ethers | .05% "Tensol No. 52" | do | .195 | .175 |
| Sulphonated naphthenic acid | .05% sulphonated naph. acid | do | .195 | .170 |
| Phosphorated oil | .05% phosphorated castor oil | do | .195 | .175 |
| Highly sulphonated oil | .05% "Prestabit V" | do | .195 | .180 |
| (b) USING RAYON-GRADE COTTON LINTERS | | | | |
| Soap forming materials | .05% Hemlock resin | To linters | .165 | .165 |
| Alkyl aryl sulphonates | .1% "Alkanol B" | do | .165 | .170 |
| | .1% "Santomerse No. 3" | do | .170 | .170 |

It will be evident that the improvement in the comminution of the alkali cellulose resulting from our invention may be applied to other fields than that of viscose, e. g. the preparation of cellulose ethers and cuprammonium solutions from pulp by processes using shredded alkali cellulose.

3. *Xanthation.*—The pulps treated with our agents xanthate much more completely and uniformly. This is probably due in part to improvements in the prior step of shredding, but as evidenced from our experiments, is also due in part to an actual improvement of the xanthation reaction itself. This improvement in the xanthation reaction is very probably brought about through a better penetration of the alkali cellulose particles by the carbon bisulphide.

The result of improved xanthation is that viscose can be obtained which is very largely free from undissolved fibers and partly dissolved fibers or gels. This is very advantageous in that when the viscose is subsequently filtered, filtration is much more rapid and the filters remain open for a much longer time.

This result is of extreme importance, since it cannot be realized otherwise such as by merely using an unduly large excess of carbon bisulphide in the xanthation reaction. Such excesses not only alter the properties of the xanthated crumb in an undesirable manner, but also alter the properties of the finished viscose solution, so that there is an interference with normal processing.

On the other hand our discovery includes the unexpected result in the xanthation reaction, that with the use of our agents it is also possible to use lesser amounts of carbon bisulphide than are normally employed in xanthating. The quantity of carbon bisulphide involved in producing viscose is fairly standard and accordingly it was very unexpected that our discovery or invention should result in producing viscose of satisfactory quality with a smaller amount of carbon bisulphide than heretofore has been found necessary to produce yarn of a given quality. This has the direct result of lessening the viscose ripening time, as well as a saving of chemicals—thus lessening the production cost.

It has been stated above that with the use of our agents it is possible to use lower amounts of carbon bisulphide than normally employed in xanthating and to thus shorten the ripening time. Under normal conditions the use of less carbon bisulphide also produces the same effect but the physical properties of the yarn are impaired in that lower elongations are obtained. If, however, the amount of carbon bisulphide is reduced in the presence of one of our agents, such a lowering of the elongation does not take place. This is an unexpected result. Another advantage of the use of smaller amounts of carbon bisulphide lies in the fact that the tendency toward undesirable milkiness in the rayon is materially minimized.

4. *Dissolving.*—The thoroughness and uniformity of the xanthation reaction when carried out with the use of surface active agents according to our invention is evidenced by the low number of partially reacted and unreacted fibers remaining after the xanthated product is dissolved in dilute caustic soda. Microscopic comparison of normal viscose preparations with viscose prepared using surface active agents according to our invention show very substantial reductions in undissolved and partly dissolved fibers as can be seen from Table II. Such reduction in the amount of undissolved fibers and gels was not obtained in the similar experiments using rayon-grade cotton linters.

TABLE II

*Effect of treatment with anion active materials prior to completion of xanthation on the amount of undissolved and partially dissolved fibers in the viscose*

| Type of material | Amount based on pulp and specific material | Where added | Total number of undissolved and partially dissolved fibers/cc. | |
|---|---|---|---|---|
| | | | Untreated | Treated |
| (a) USING REFINED CHEMICAL PULPS CONTAINING APPROXIMATELY 0.065% ETHER EXTRACT | | | | |
| Fatty acid soaps | .05% sodium oleate | To pulp | Over 500 | 80 |
| | .1% sodium oleate | do | 1,700 | 62 |
| | .1% sodium oleate | do | 442 | 42 |
| Resin acid soaps | .15% rosin soap | do | Over 500 | 78 |
| Soap forming materials | .15% linseed oil | do | Over 500 | 78 |
| Alkyl aryl sulphonates | .1% "Alkanol B" | do | 1,700 | 162 |
| | .02% "Santomerse No. 3" | do | Over 500 | 72 |
| Highly sulphonated oil | .05% "Prestabit V" | To steeping caustic | 1,700 | 42 |
| (b) USING RAYON-GRADE COTTON LINTERS | | | | |
| Soap | .04% sodium oleate | To linters | Over 1,000 | Over 1,000 |
| Alkyl aryl sulphonates | .1% "Alkanol B" | do | 1,062 | 1,116 |
| | .1% "Santomerse No. 3" | do | 1,062 | 1,118 |

5. *Filtration.*—Our invention remarkably facilitates the various filtration steps which the viscose undergoes subsequent to xanthation. This increase in filtration rate is due at least in part to a very substantial reduction in undissolved fibers and gels which are very effective in clogging the filtration medium. If the product is relatively free of undissolved or partially dissolved fibers or gels, the filter medium will continue unclogged for long periods eliminating frequent interruptions of the filtering process to permit the installation of fresh filtering media. This is obviously a distinct advantage.

Examples of the improvement in filtration brought about by our agents over normally prepared viscose when using a refined chemical pulp are shown by the laboratory filtration data in Table III. It will again be noted that no such improvement was obtained when rayon-grade cotton linters were used.

TABLE III

*Effect of treatment with anion active materials prior to completion of xanthation on the viscose filtration rate*

| Type of material | Amount based on pulp and specific material | Where added | Viscose filtration rate (cc. per sq. cm. per hour) | |
|---|---|---|---|---|
| | | | Untreated | Treated |
| (a) USING REFINED CHEMICAL PULPS CONTAINING APPROXIMATELY 0.065% ETHER EXTRACT | | | | |
| Fatty acid soaps | .02% sodium oleate | To pulp | 527 | 625 |
| | .05% sodium oleate | do | 175 | 810 |
| | .1% sodium oleate | do | 275 | 710 |
| Resin acid soaps | .15% rosin soap | do | 175 | 870 |
| Soap forming materials | .05% coconut oil | do | 527 | 805 |
| | .15% linseed oil | do | 175 | 850 |
| | .05% diglycol oleate | do | 330 | 510 |
| | .08% hemlock resin | do | 527 | 690 |
| Alkyl aryl sulphonates | .1% "Alkanol B" | do | 275 | 910 |
| | .15% "Nacconol NR" | do | 175 | 750 |
| | .02% "Santomerse No. 3" | do | 527 | 590 |
| Sulphated fatty alcohols | .05% sodium lauryl sulphate | do | 527 | 678 |
| Sulphonated ether | .05% "Tensol No. 52" | do | 527 | 775 |
| Sulphonated naphthenic acid | .05% sulphonated naphthenic acid. | do | 527 | 690 |
| Phosphorated oil | .05% phosphorated castor oil | do | 527 | 790 |
| Highly sulphonated oil | .05% "Prestabit V" | To steeping caustic | 325 | 655 |
| | .05% "Prestabit V" | Sprayed in shredder | 527 | 700 |
| (b) USING RAYON-GRADE COTTON LINTERS | | | | |
| Soap | .04% sodium oleate | To linters | 240 | 270 |
| | .09% sodium oleate | do | 240 | 270 |
| Soap forming materials | .05% hemlock resin | do | 155 | 195 |
| Alkyl aryl sulphonates | .1% "Alkanol B" | do | 290 | 250 |
| | .1% "Santomerse No. 3" | do | 290 | 255 |

Table IV shows: (1) That to obtain the greater part of the improvement it is not necessary to provide a uniform distribution of the surface active agents in the pulp sheet, which in turn demonstrates that our invention is not primarily concerned with an improvement in wetting of pulp sheets during steeping and (2) that it is absolutely necessary to add the surface active materials before completion of xanthation in order to obtain the improvement claimed in our invention.

TABLE IV

*Effect of method of adding anion active materials to viscose process*

[Using refined chemical pulp of 0.060% ether extract]

| Method of adding sodium oleate (.1%) | Filtration rate | | Total number of undissolved and partially dissolved fibers/cc. | |
|---|---|---|---|---|
| | Control | Treated | Control | Treated |
| Uniformly distributed over all pulp sheets | 175 | 900 | Over 500 | 90 |
| Concentrated on one sheet out of a total of twenty-two sheets | 175 | 840 | Over 500 | 66 |
| Added to viscose | 175 | 150 | Over 500 | Over 500 |

6. *Emulsification.*—The use of anion active agents according to our invention substantially improves the ease with which mineral oil may be dispersed in the viscose and the stability of emulsions thus formed in the production of delustered yarns. These anion active agents of our discovery provide emulsions characterized by minuteness of particle size.

The particular anion active agents of our discovery, or the agents giving rise thereto, may be classified as follows:

*A. Agents substantially insoluble in both approximately 18% caustic soda and 5 to 8% caustic soda*

1. Soaps—alkali salts of fatty acids, e. g. sodium oleate.
2. Soaps—alkali salts of resin acids, e. g. sodium rosinate.
3. Soap forming agents—natural and synthetic fats, fatty and resin acids, etc., e. g. coconut oil, linseed oil, soya bean oil, cottonseed oil, glycol dioleate, oleic acid, rosin, tall oil (comprising resins, fats, waxes, etc. from wood). These will be transformed into soaps in the steeping step.
4. Alkyl aryl sulphonates, e. g. "Alkanol B," "Nacconol N. R.," "Santomerse #3."
5. Sulphated fatty alcohols, e. g. sodium lauryl sulphate.
6. Sulphonated ethers substantially insoluble in both approximately 18% caustic soda and 5 to 8% caustic soda, of which one sold under the trade name of "Tensol #52," is found very suitable in our invention.
7. Sulphonated naphthenic acids.
8. Phosphorated oil, e. g., phosphorated castor oil.

*B. Agents soluble in both approximately 18% caustic soda and 5 to 8% caustic soda*

1. Highly sulphonated animal or vegetable oils, of which one is sold under the trade name of "Prestabit V," which, according to Dr. A. Landolt in Melliands Textilberichten IX, 1928, page 760, is a sulphoricinate with a sulphonation degree of 93% of the theoretical possible.
2. Sulphonated ethers soluble in both approximately 18% caustic soda and 5 to 8% caustic soda, of which one sold under the trade name of "Triton 720," is found very suitable in our invention.

The effective range of the compounds employed has been found by us to be from .05% to .15%. With 0.01% some of the improvements of our invention begin to manifest themselves and this effect increases as the concentration increases up to about .1%. Thereafter there seems to be little improvement i. e., in filtration. There are disadvantages to using higher concentrations than .15% other than the matter of expense. As regards treatment of the pulp such higher concentrations would cause excessive softness in the sheet resulting in mechanical difficulties in steeping. Also the viscose obtained would be excessively turbid and there would even be dangers of clogging the filters or of obtaining poor yarn. Furthermore with either the materials insoluble in 18% caustic soda or those soluble in 18% caustic soda, higher concentrations of the agents cause difficulties, in xanthation due to excessive ball formation, in dissolving due to excessive foaming and subsequently in de-aerating the viscose.

It will be understood that the use of anion active agents according to our invention is not subject to any limitations as to the methods of application other than that the materials be added prior to the completion of xanthation. Practical methods for carrying out the invention include both treatment of the pulp prior to use in the viscose process and the introduction of the agents at some point during the processing of the pulp into viscose prior to the completion of xanthation. In the latter case, for example, the agents may be sprayed into the shredder prior to the completion of shredding or if they are of the class soluble in caustic soda of mercerizing strength, they may be dissolved in the steeping caustic solution.

As regards treatment of the pulp with the agents of our discovery prior to use in the viscose process, examples of practical methods of treatment follow though it is to be understood that our invention is not limited to any specific method of application. A very suitable point in pulp manufacture for treatment with anion active agents is the addition to the pulp on the machine subsequent to sheet formation but prior to drying. The agents can be suitably added from aqueous solutions either by means of sprays or by means of a rotating roll partly immersed in the treating solution.

It is also possible to treat the pulp while in suspension prior to sheet formation as for example in a stock chest, but this would necessitate the almost complete re-use of the white water on the machine without diversion to other parts of the plant in order to prevent excessive loss of the materials and to prevent interference with other parts of the process.

We claim:

1. The method of improving the processing of refined chemical pulp containing not more than 0.15% ether extractable matter into viscose, comprising forming refined chemical pulp containing not more than 0.15% ether extractable matter into an alkali cellulose; shredding said alkali cellulose; reacting said shredded alkali cellulose with carbon disulphide, whereby xanthation occurs; providing a viscose which comprises the reaction products of said shredded alkali cellulose and said carbon disulphide; and adding at a stage prior to completion of xanthation a surface active agent of the anion active class which has substantially the same solubility characteristic in caustic soda solutions of both mercerizing and the more dilute strengths normally present in viscose, said agents being added in the range of 0.01% to 0.15% by weight, such percentages being based upon the weight of the bone dry pulp.

2. The method of improving the processing of refined chemical pulp containing not more than 0.15% ether extractable matter into viscose, comprising forming refined chemical pulp containing not more than 0.15% ether extractable matter into an alkali cellulose; shredding said alkali cellulose; reacting said shredded alkali cellulose with carbon disulphide, whereby xanthation occurs; providing a viscose which comprises the reaction products of said shredded alkali cellulose and said carbon disulphide; and adding at a stage prior to completion of xanthation a surface active agent of the anion active class which is substantially insoluble in caustic soda solutions of both mercerizing and the more dilute strengths normally present in viscose, said agents being added in the range of 0.01% to 0.15% by weight, such percentages being based upon the weight of the bone dry pulp.

3. The method of improving the processing of refined chemical pulp containing not more than 0.15% ether extractable matter into viscose, comprising forming refined chemical pulp containing not more than 0.15% ether extractable matter into an alkali cellulose; shredding said alkali cellulose; reacting said shredded alkali cellulose with carbon disulphide, whereby xanthation occurs; providing a viscose which comprises the reaction products of said shredded alkali cellulose and said carbon disulphide; and adding at a stage prior to completion of xanthation a surface active agent of the anion active class which is substantially soluble in caustic soda solutions of both mercerizing and the more dilute strengths normally present in viscose, said agents being added in the range of 0.01% to 0.15% by weight, such percentages being based upon the weight of the bone dry pulp.

4. The method of improving the processing of refined chemical pulp containing not more than 0.15% ether extractable matter into viscose, comprising forming refined chemical pulp containing not more than 0.15% ether extractable matter into an alkali cellulose; shredding said alkali cellulose; reacting said shredded alkali cellulose with carbon disulphide, whereby xanthation occurs; providing a viscose which comprises the reaction products of said shredded alkali cellulose and said carbon disulphide; and adding at a stage prior to completion of xanthation a surface active agent of the anion active class of the alkyl aryl sulphonate group in the range of 0.01% to 0.15% by weight, such percentages being based upon the weight of the bone dry pulp.

5. The method of improving the processing of refined chemical pulp containing not more than 0.15% ether extractable matter into viscose, comprising forming refined chemical pulp containing not more than 0.15% ether extractable matter into an alkali cellulose; shredding said alkali cellulose; reacting said shredded alkali cellulose with carbon disulphide, whereby xanthation occurs; providing a viscose which comprises the reaction products of said shredded alkali cellulose and said carbon disulphide; and adding at a stage prior to completion of xanthation a fatty acid soap in the range of 0.01% to 0.15% by weight, such percentages being based upon the weight of the bone dry pulp.

6. The method of improving the processing of refined chemical pulp containing not more than 0.15% ether extractable matter into viscose, comprising forming refined chemical pulp containing not more than 0.15% ether extractable matter into an alkali cellulose; shredding said alkali cellulose; reacting said shredded alkali cellulose with carbon disulphide, whereby xanthation occurs; providing a viscose which comprises the reaction products of said shredded alkali cellulose and said carbon disulphide; and adding at a stage prior to completion of xanthation sodium oleate in the range of 0.01% to 0.15% by weight, such percentages being based upon the weight of the bone dry pulp.

7. The method of improving the processing of refined chemical pulp containing not more than 0.15% ether extractable matter into viscose, comprising forming refined chemical pulp containing not more than 0.15% ether extractable matter into an alkali cellulose; shredding said alkali cellulose; reacting said shredded alkali cellulose with carbon disulphide, whereby xanthation occurs; providing a viscose which comprises the reaction products of said shredded alkali cellulose and said carbon disulphide; and adding at a stage prior to completion of shredding a surface active agent of the anion active class which has substantially the same solubility characteristic in caustic soda solutions of both mercerizing and 5–8% strengths, said agents being added in the range of 0.01% to 0.15% by weight, such percentages being based upon the weight of the bone dry pulp.

8. The method of improving the processing of refined chemical pulp containing not more than 0.15% ether extractable matter into viscose, comprising forming refined chemical pulp containing not more than 0.15% ether extractable matter into an alkali cellulose; shredding said alkali cellulose; reacting said shredded alkali cellulose with carbon disulphide, whereby xanthation occurs; providing a viscose which comprises the reaction products of said shredded alkali cellulose and said carbon disulphide; and adding to the pulp prior to use a surface active agent of the anion active class which has substantially the same solubility characteristic in caustic soda solutions of both mercerizing and the more dilute strengths normally present in viscose, said agents being added in the range of 0.01% to 0.15% by weight, such percentages being based upon the weight of the bone dry pulp.

9. The method of improving the processing of refined chemical pulp containing not more than 0.15% ether extractable matter into viscose, comprising forming refined chemical pulp containing not more than 0.15% ether extractable matter into an alkali cellulose; shredding said alkali cellulose; reacting said shredded alkali cellulose with carbon disulphide, whereby xanthation occurs; providing a viscose which comprises the reaction products of said shredded alkali cellulose and said carbon disulphide; and adding to the pulp prior to use a surface active agent of the anion active class which is substantially insoluble in caustic soda solutions of both mercerizing and the more dilute strengths normally present in viscose, said agents being added in the range of 0.01% to 0.15% by weight, such percentages being based upon the weight of the bone dry pulp.

10. The method of improving the processing of refined chemical pulp containing not more than 0.15% ether extractable matter into viscose, comprising forming refined chemical pulp containing not more than 0.15% ether extractable matter into an alkali cellulose; shredding said alkali cellulose; reacting said shredded alkali cellulose with carbon disulphide, whereby xanthation occurs; providing a viscose which comprises the reaction products of said shredded alkali cellulose and said carbon disulphide; and adding to the pulp prior to use a surface active agent of the anion active class of the alkyl aryl sulphonate group in the range of 0.01% to 0.15% by weight, such percentages being based upon the weight of the bone dry pulp.

11. The method of improving the processing of refined chemical pulp containing not more than 0.15% ether extractable matter into viscose, comprising forming refined chemical pulp containing not more than 0.15% ether extractable matter into an alkali cellulose; shredding said alkali cellulose; reacting said shredded alkali cellulose with carbon disulphide, whereby xanthation occurs; providing a viscose which comprises the reaction products of said shredded alkali cellulose and said carbon disulphide; and adding to the pulp prior to use a fatty acid soap in the range of 0.01% to 0.15% by weight, such percentages being based upon the weight of the bone dry pulp.

12. The method of improving the processing of refined chemical pulp containing not more than 0.15% ether extractable matter into viscose, comprising forming refined chemical pulp containing not more than 0.15% ether extractable matter into an alkali cellulose; shredding said alkali cellulose; reacting said shredded alkali cellulose with carbon disulphide, whereby xanthation occurs; providing a viscose which comprises the reaction products of said shredded alkali cellulose and said carbon disulphide; and adding to the pulp prior to use sodium oleate in the range of 0.01% to 0.15% by weight, such percentages being based upon the weight of the bone dry pulp.

13. The method of improving the processing of refined chemical pulp containing not more than 0.15% ether extractable matter into viscose, comprising forming refined chemical pulp containing not more than 0.15% ether extractable matter into an alkali cellulose; shredding said alkali cellulose; reacting said shredded alkali cellulose with carbon disulphide, whereby xanthation occurs; providing a viscose which comprises the reaction products of said shredded alkali cellulose and said carbon disulphide; and adding at a stage prior to completion of xanthation a soap forming agent derived from a fatty acid, said agent being added in the range of 0.01% to 0.15% by weight, such percentages being based upon the weight of the bone dry pulp, whereby a surface active agent of the anion active class develops prior to completion of xanthation.

14. The method of improving the processing of refined chemical pulp containing not more than 0.15% ether extractable matter into viscose, comprising forming refined chemical pulp containing not more than 0.15% ether extractable matter into an alkali cellulose; shredding said alkali cellulose; reacting said shredded alkali cellulose with carbon disulphide, whereby xanthation occurs; providing a viscose which comprises the reaction products of said shredded alkali cellulose and said carbon disulphide; and adding to the pulp prior to use a soap forming agent derived from a fatty acid, said agent being added in the range of 0.01% to 0.15% by weight, such percentages being based upon the weight of the bone dry pulp, whereby a surface active agent of the anion active class develops prior to completion of xanthation.

PAUL HENRY SCHLOSSER.
KENNETH RUSSELL GRAY.
EARL GRAND HALLONQUIST.